United States Patent
Shevin-Sandy

(10) Patent No.: US 7,887,021 B2
(45) Date of Patent: Feb. 15, 2011

(54) LAPTOP HOLDER FOR EXERCISE APPARATUS

(75) Inventor: Bonni Shevin-Sandy, Morton Grove, IL (US)

(73) Assignee: Dard Products, Inc., Evanston, IL (US)

( * ) Notice: Subject to any disclaimer, the term of this patent is extended or adjusted under 35 U.S.C. 154(b) by 740 days.

(21) Appl. No.: 11/238,327

(22) Filed: Sep. 29, 2005

(65) Prior Publication Data

US 2007/0069101 A1   Mar. 29, 2007

(51) Int. Cl.
*A47B 23/04* (2006.01)
(52) U.S. Cl. .............. 248/447.1; 248/443; 248/444; 248/447.2; 248/444.1; 248/445; 248/450; 248/441.1; 108/42; 108/50.02; 108/50.11; 108/50.16; 70/57; 70/57.1; 70/58
(58) Field of Classification Search ............. 248/443, 248/444, 447.1, 447.2, 444.1, 445, 450, 441.1; 108/42, 50.02, 50.11, 50.16; 70/57, 57.1, 70/58
See application file for complete search history.

(56) References Cited

U.S. PATENT DOCUMENTS

| | | | | |
|---|---|---|---|---|
| 759,048 A * | 5/1904 | Walter | ...... | 248/444 |
| 1,347,471 A * | 7/1920 | Connors | ...... | 248/445 |
| 1,742,822 A * | 1/1930 | Olson | ...... | 297/255 |
| 2,286,048 A * | 6/1942 | Bahr | ...... | 248/442.2 |
| 2,333,353 A * | 11/1943 | Zanella | ...... | 248/452 |
| 2,359,895 A * | 10/1944 | Burton | ...... | 248/445 |
| 2,853,219 A * | 9/1958 | Schwartz | ...... | 224/275 |
| 2,918,202 A * | 12/1959 | Constantine et al. | ...... | 224/276 |
| 3,128,573 A * | 4/1964 | Cook et al. | ...... | 248/445 |
| 4,383,626 A * | 5/1983 | Weinblatt | ...... | 224/275 |
| 4,635,110 A * | 1/1987 | Weinblatt | ...... | 348/837 |
| 4,726,607 A * | 2/1988 | White | ...... | 281/45 |
| 4,867,407 A * | 9/1989 | Becker | ...... | 248/444.1 |
| 4,969,623 A * | 11/1990 | Bernier | ...... | 248/441.1 |
| 5,085,427 A | 2/1992 | Finn | | |
| 5,330,049 A * | 7/1994 | Bertelsen et al. | ...... | 206/279 |
| 5,411,192 A * | 5/1995 | Xiao | ...... | 224/153 |
| 5,413,305 A * | 5/1995 | Leeb | ...... | 248/460 |
| 5,607,091 A * | 3/1997 | Musacchia | ...... | 224/222 |
| 5,655,999 A | 8/1997 | Drew | | |
| 5,862,933 A * | 1/1999 | Neville | ...... | 220/17.1 |
| 6,015,129 A * | 1/2000 | Harrigan | ...... | 248/444 |
| 6,035,789 A * | 3/2000 | Ben-Haim | ...... | 108/43 |
| 6,092,705 A * | 7/2000 | Meritt | ...... | 224/275 |
| 6,097,448 A * | 8/2000 | Perkins | ...... | 348/837 |
| 6,183,133 B1 * | 2/2001 | Roegner | ...... | 383/39 |
| 6,202,973 B1 * | 3/2001 | Navarin et al. | ...... | 248/444 |
| 6,216,927 B1 * | 4/2001 | Meritt | ...... | 224/275 |
| 6,269,948 B1 * | 8/2001 | Jackson | ...... | 206/320 |
| 6,354,477 B1 * | 3/2002 | Trummer | ...... | 224/575 |

(Continued)

*Primary Examiner*—Terrell Mckinnon
*Assistant Examiner*—Nkeisha J Smith
(74) *Attorney, Agent, or Firm*—Greer, Burns & Crain, Ltd.

(57) ABSTRACT

A laptop holder for an exercise apparatus is provided which includes a base having a generally planar front surface for receiving a laptop computer and a rear surface configured for engaging a generally planar surface of the exercise apparatus. At least one strap extends from the base and is configured to wrap around a portion of the exercise apparatus to form a loop with the base. Disposed on the base is a pocket defining a pocket opening for receiving a laptop computer.

9 Claims, 6 Drawing Sheets

U.S. PATENT DOCUMENTS

| | | | |
|---|---|---|---|
| 6,520,894 B1 * | 2/2003 | Mesloh | 482/148 |
| 6,648,282 B1 * | 11/2003 | Sykes | 248/118 |
| 6,663,058 B1 * | 12/2003 | Peterson et al. | 248/125.9 |
| 6,663,072 B1 * | 12/2003 | Ritchey et al. | 248/444 |
| 6,685,016 B2 * | 2/2004 | Swaim et al. | 206/320 |
| 6,796,473 B2 * | 9/2004 | Purpura | 224/576 |
| 6,897,832 B2 * | 5/2005 | Essig et al. | 343/912 |
| 6,928,654 B2 * | 8/2005 | Tranchina et al. | 725/75 |
| 6,994,236 B2 * | 2/2006 | Hsu | 224/275 |
| 7,017,878 B2 * | 3/2006 | Guo et al. | 248/309.1 |
| 7,048,163 B2 * | 5/2006 | Albert et al. | 224/275 |
| 7,156,026 B2 * | 1/2007 | McClellion | 108/43 |
| 7,207,088 B2 * | 4/2007 | Adams et al. | 16/413 |
| 7,301,757 B2 * | 11/2007 | Lee et al. | 361/681 |
| 7,335,147 B2 * | 2/2008 | Jones et al. | 482/148 |
| 7,360,649 B2 * | 4/2008 | Swaim et al. | 206/320 |
| 2004/0083930 A1 * | 5/2004 | Han | 108/44 |
| 2005/0072893 A1 * | 4/2005 | Brown | 248/444 |
| 2008/0023614 A1 * | 1/2008 | Beck | 248/444 |

* cited by examiner

LAPTOP HOLDER FOR EXERCISE APPARATUS

BACKGROUND OF THE INVENTION

This application relates generally to supports for electronic devices such as laptop computers, and more particularly, such a support or holder that may be mounted on an exercise apparatus.

Exercise equipment frequently includes display screens which display various functions of the machine and calculated results of the user. For example, these screens may indicate, among other things, the time the user has been on the machine, the difficulty level of the exercise routine, the calories burned by the user and/or the speed at which the user is exercising. While providing valuable information, these screens do not need to be monitored by the user. In fact, users will often opt to read books, do work, listen to music, or even surf the Internet while exercising.

A user faces obstacles to accomplishing multiple tasks when the exercise apparatus does not accommodate the tools required for the other task. For example, a user of an exercise apparatus encounters the problem of being unable to securely and usably support a laptop computer on the exercise apparatus to use while exercising. Without adequate support, the user risks dropping the laptop from the exercise equipment. Alternatively, with conventional exercise arrangements, the user is often forced to place the laptop in an inconvenient location, making keying on the keyboard difficult. Further, when arranging their body to use an inconveniently located laptop, the user risks evading the full benefit of the exercise apparatus.

Thus, there is a need for an improved electronic device support such as a laptop holder for an exercise apparatus that enables a user to exercise and use the laptop.

SUMMARY OF THE INVENTION

The above-identified needs are met or exceeded by the present laptop holder for an exercise apparatus.

A laptop holder for an exercise apparatus is provided which includes a base having a generally planar front surface for receiving a laptop computer and a rear surface configured for engaging a generally planar surface of the exercise apparatus. At least one strap extends from the base and is configured to wrap around a portion of the exercise apparatus to form a loop with the base. Disposed on the base is a pocket defining a pocket opening for receiving a laptop computer.

Another embodiment of a laptop holder for an exercise apparatus is provided which includes a base having a generally planar front surface for receiving a laptop computer and a rear surface configured for engaging a generally planar surface of the exercise apparatus. A removable securing device is disposed on the base and is configured for engaging a generally cylindrical member of the exercise apparatus. Also disposed on the base is a pocket defining a pocket opening for receiving a laptop computer.

A system for supporting a laptop on a piece of exercise equipment having a generally planar surface and/or a generally cylindrical member is also provided. A base having a generally planar front surface for receiving a laptop computer has a rear surface configured for engaging the generally planar surface of the exercise apparatus. At least one strap extends from the base and is configured to wrap around a portion of the exercise apparatus to form a loop with the base. Also, a removable securing means is located on the rear surface of the base for engaging the generally cylindrical member of the exercise apparatus.

DETAILED DESCRIPTION OF THE INVENTION

Figure 1:
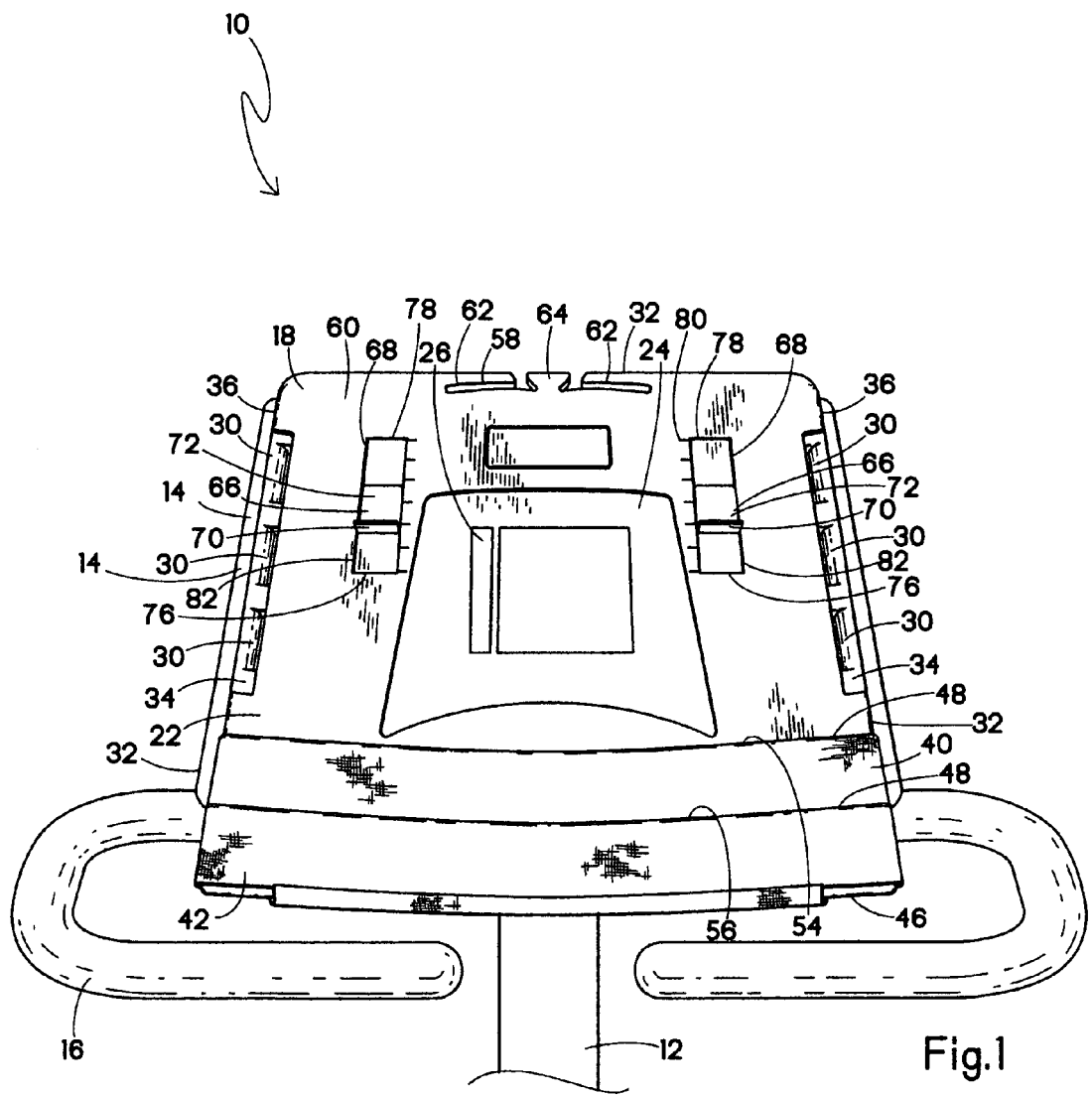
FIG. 1 is a front perspective view of a laptop holder mounted on an exercise apparatus.
Figure 2:
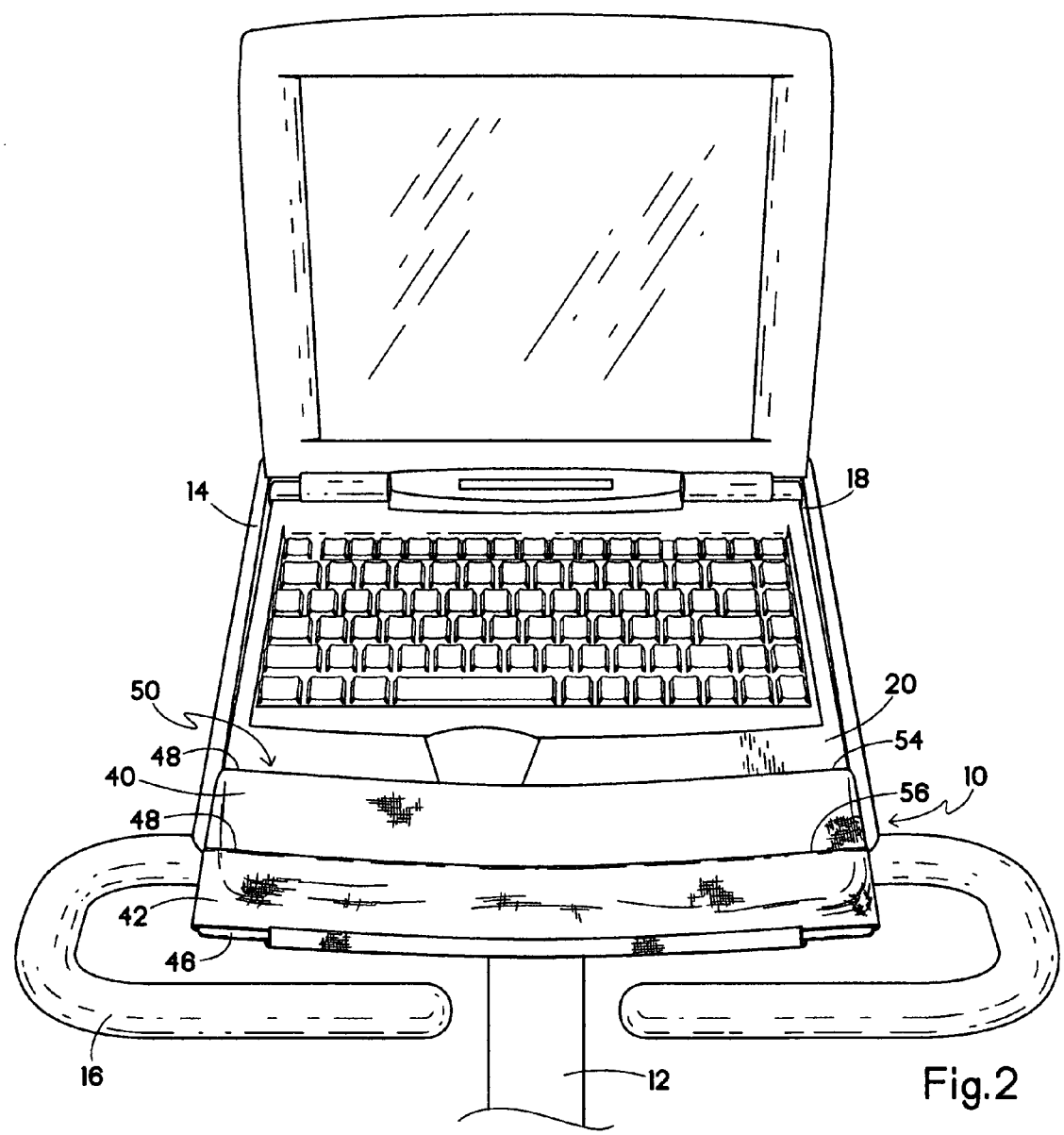
FIG. 2 is a front perspective view of the laptop holder of FIG. 1 holding a laptop computer.

Referring now to FIG. 1, a laptop holder is generally designated 10, and is configured for mounting on an exercise apparatus 12. In the preferred embodiment, the laptop holder 10 is configured for selective mounting on the exercise apparatus 12 having a generally planar surface 14, such as a panel display or a support tray, or a generally cylindrical member 16, such as handlebars. The present holder 10 can be used with many different types of exercise equipment, such as stationary bicycles, treadmills, stair climbing machines, elliptical machines, alpine ski simulators, and the like. Also, while referred to as a laptop holder, the device 10 may be used for supporting other electronic appliances on exercise equipment or other surfaces.

As seen in FIG. 1, the laptop holder 10 is mounted on the planar surface 14 and includes a generally flat base 18. Having a generally rectangular shape, the base 18 is preferably made of plastic, although other materials are contemplated having suitable strength, weight and cost properties. A plastic construction allows the base 18 to support the weight of a laptop 20 upon a generally planar front surface 22 of the base, while remaining lightweight and easy to mount on the exercise apparatus 12. Further, the plastic construction enables the laptop holder 10 to resist shocks and impacts.

The base 18 includes an optional window 24 preferably disposed centrally on the base. When the base 18 is positioned over the generally planar surface 14, the window 24 permits the user to see and to access controls 26 on the generally planar surface, such as controls which indicate the time the user has been on the machine, the difficulty level of the exercise routine, the calories burned by the user and the speed at which the user is exercising. While the window 24 is shown in a stylized shape, it is contemplated that any shape or size of window may be used. Further, the window 24 permits the air vented from the laptop fan to vent a distance away from the laptop 20 when the laptop is placed over the window.

Figure 4:
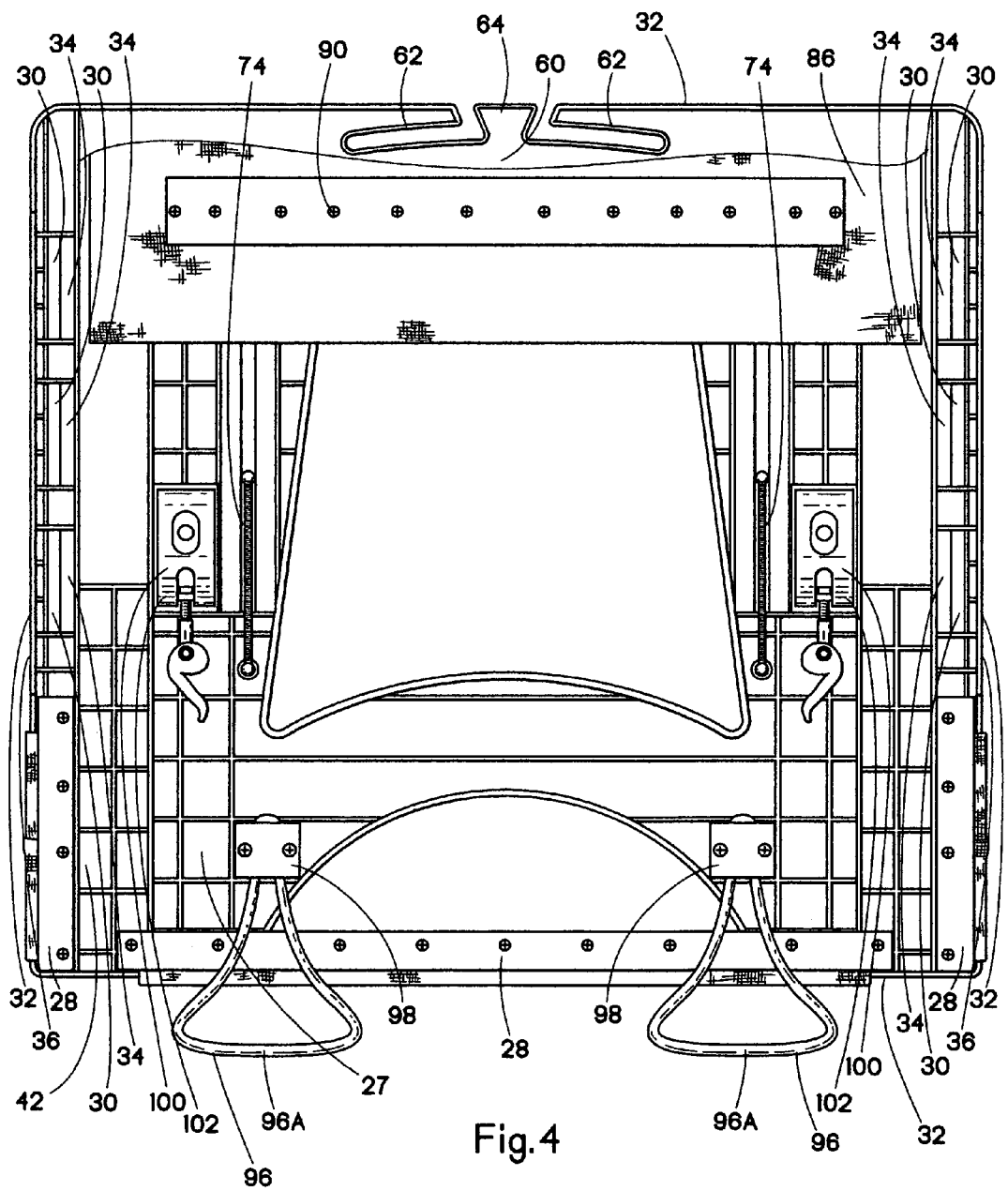
FIG. 4 is a rear view of the base of FIG. 3.

Referring to FIG. 4 and located around the periphery of the base 18 on a rear surface 27 are contact surfaces 28. The contact surfaces 28 are configured to make frictional contact with the generally planar surface 14 to prevent the laptop holder 10 from sliding down the typically inclined generally planar surface. Since the contact surfaces 28 also inhibit air flow from beneath the base 18 from escaping outside the base, vents 30 are preferably disposed near at least one edge 32 of the base. In the preferred embodiment, the vents 30 are apertures located in recesses 34 generally along two side edges 36 of the base 18. When the laptop fan vents excess heat, the fan blows the hot air from a bottom surface of the laptop 20 through the window 24 of the base 18. The vented air then travels between the base 18 and the generally planar surface 14 until the air escapes from beneath the base through the vents 30.

Figure 3:
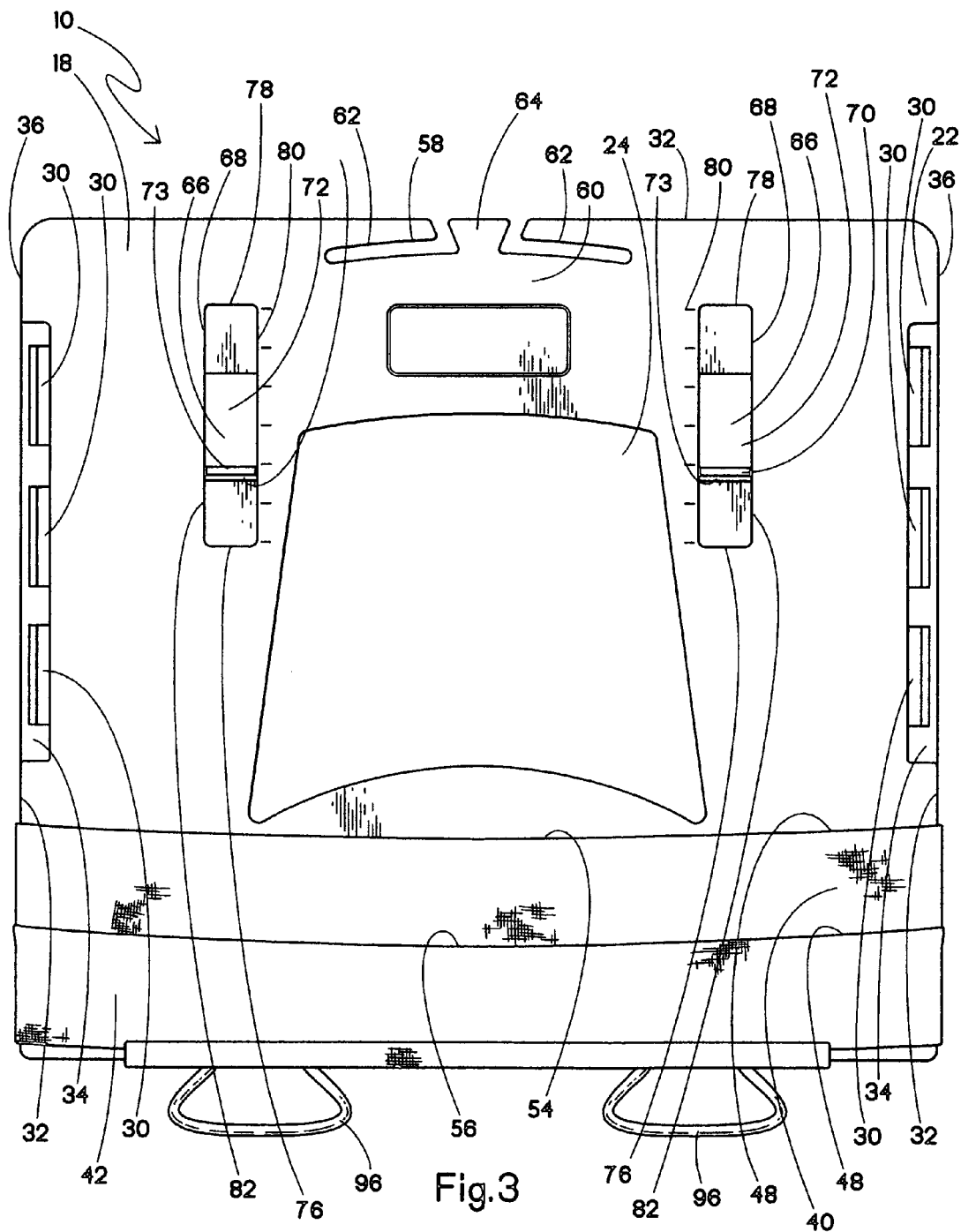
FIG. 3 is a front view of a base of the laptop holder of FIG. 1.

Referring again to FIGS. 1 and 3, a pocket 40 is preferably disposed on a lower portion 42 of the front surface 22 of the base 18. Generally elongate, the pocket 40 preferably spans the length of the base 18, and is preferably attached at the two side edges 36, as well as a bottom edge 46. The pocket 40 defines at least one pocket opening 48 for receiving a portion of the laptop 50, preferably the portion of the laptop located below the keyboard. In the present application, the "pocket" may be any flexible structure secured to the holder 10 at least two of the group of the two side edges 36 and the bottom edge 46. Thus, an "open-bottomed" pocket is contemplated.

Preferably made from a generally elastic or weblike material, the pocket 40 holds the laptop 20 and prevents the laptop from sliding off the front surface 22 of the base 18. In use, a user may place their hands on the pocket 40 when using the laptop 20. The pocket 40 is preferably made of material that is water resistant to prevent moisture on the user's hands from reaching the laptop, and breathable to permit the user's hands from accumulating more moisture. Further, the pocket 40 is made from a material exhibiting slide resistant characteristics for gripping the laptop 20 and preventing the laptop from moving around within the pocket.

In the preferred embodiment, the pocket 40 includes multiple pocket openings 48 for holding the laptop 20 at preferred locations on the base 18. Further, the multiple pocket openings 48 are dimensioned for accommodating different sized laptops 20. For example, a smaller laptop 20 may be received in an upper pocket opening 54 to position the laptop higher on the base 18, and a larger laptop may be received in a lower pocket opening 56 to position the laptop lower on the base. It is contemplated that multiple pockets 40 having different sizes, shapes and arrangements may be used. Additionally, pockets 40 for storing accessories such as pens and paper are contemplated.

An accessory formation 58 is preferably disposed on the base 18 for use with computer accessories or non-computer accessories. Preferably on an upper portion 60 of the base 18, the accessory formation 58 preferably includes a plurality of slits 62 extending from a generally central portion 64 towards each side edge 36 of the base. A power cord (not shown), or any other cord, may be fed through the slit 62. Alternatively, if the user chooses to engage in an activity other than using a laptop 20, a music stand or a book holder, for example, may be clipped to or mounted at the accessory formation 58.

The front surface 22 of the base 18 preferably includes at least one tab 66. In the preferred embodiment, there are two tabs 66 spaced apart on the upper portion 60 of the base 18. Preferably having an "L"-shape, the tabs 66 are preferably spring-loaded and are configured for urging the laptop 20 into the pocket 40. Alternatively, the tabs 66 can be used to selectively prop the laptop 20 up off the base 18 at an incline. The tabs 66 are slidably disposed within slots 68, such as in a tongue-in-groove arrangement, between an extended and a retracted position, permitting the tabs to slide towards and away from the center of the base 18. A short leg 70 of the "L"-shaped tab 66 extends generally perpendicularly to the base 18, while a long leg 72 of the "L"-shaped tab 66 extends generally parallel to the base 18 within the slot 68. Pads 73 are preferably attached to the short legs 70 for enhancing frictional contact with the laptop 20.

Referring now to FIG. 4, springs 74 attach the tabs 66 to the base 18 and bias the slidable tabs to an extended position toward a lower end 76 of the slot 68. The tabs 66 are positioned by the user for desired clamping force or desired incline of the laptop 20 by moving or retracting the tabs against the force of the springs 74 toward an upper end 78 (for larger laptops or for decreased inclination) or toward the lower end 76 (for smaller laptops or increased inclination). Depending on the size of the laptop 20, moving the tab 66 to the upper end 78 of the slot 68 will position the tab outside the periphery of the laptop, resulting in the laptop laying flush with the front surface 22 of the base 18.

Preferably using an index 80 (FIGS. 1 and 3) on the front surface 22 of the base 18, the tabs 66 can be located at the same relative location in the slot 68, which enables the laptop to be inclined an equal amount. In one embodiment, the tabs 66 may engage notches (not shown) at the sides 82 of the slot 68 at indexed locations to counter the bias of the spring 74. When the tab 66 engages the notch, the movement of the tab within the slot 68 is prevented until a user manipulates the tab within the slot.

The laptop holder 10 is mounted on the exercise apparatus 12 by placing the rear surface 27 of the base 18 on the generally planar surface 14, preferably a display panel. Preferably, the base 18 has generally the same length and width dimensions as the generally planar surface 14, although different sizes can be used. The window 24 is positioned over the portion of the generally planar surface 14 the user would like to view when a laptop 20 is not placed on the base 18. Then, the laptop holder 10 is secured onto the exercise apparatus 12.

Figure 5:
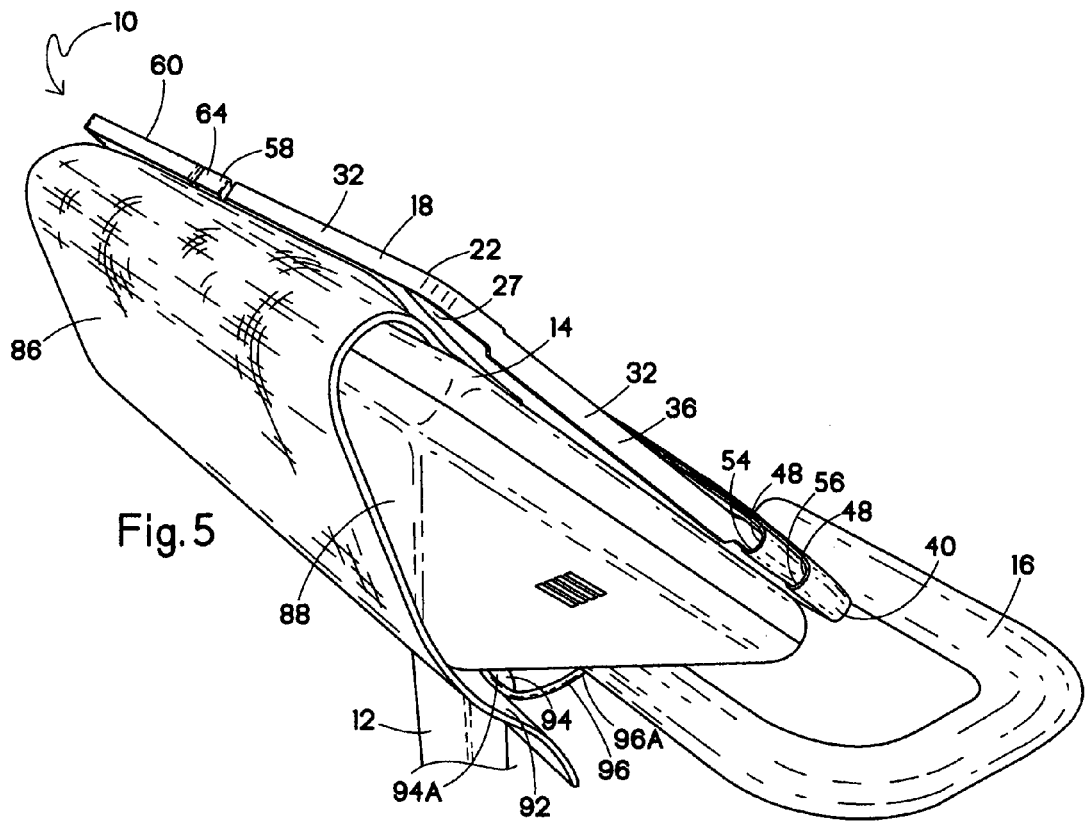
FIG. 5 is a rear perspective view of the laptop holder of FIG. 1 mounted on the exercise apparatus.

Referring now to FIGS. 4 and 5, at least one strap 86, preferably made of a textile having high tensile strength, extends from the base 18 and is configured for wrapping around a portion 88 of the exercise apparatus 12. The strap 86 is attached to the base 18, preferably with fasteners 90, chemical adhesives, ultrasonic welding or the like at the rear surface 27 of the base near the upper portion 60, and is configured to make a loop with the base when viewed from the side of the exercise apparatus 12. The strap 86 is preferably web-like and preferably has a width generally corresponding to the width of the base 18 and a length generally longer than the length of the base, although other shapes and sizes are contemplated. Further, the strap 86 may include a plurality of straps having a designated relative spacing along the base 18.

In the preferred embodiment, the strap 86 wraps around the portion of the exercise apparatus 88, which is preferably located opposite the generally planar surface 14. At an inside surface 92 of the strap 86, preferably at least one receiving formation 94, such as a hook 94A (FIG. 5), is disposed. At the lower portion 42 of the base 18, at least one securing mechanism 96, such as a ring 96A (FIG. 8), preferably extends from the rear surface 27 of the base. To secure the strap 86 in a loop with the base 18, the securing mechanism 96 is engaged with the receiving formation 94. Specifically, the rings 96A are extended back towards the strap 86 to latch onto the hooks 94A. The rings 96A may be elastic, allowing the laptop holder 10 to be used with different sized portions 88 of the exercise apparatus 12, and creating a releasable holding force when engaged by the hooks 94A.

While the preferred embodiment of latching the rings 96A onto the hooks 94A has been described, it is contemplated that other arrangements of securing or fastening the strap 86 into a loop around the exercise apparatus 12 are contemplated. Further, it is contemplated that the strap 86 may be directly attached or selectively attachable to the base 18 at both the lower and upper portions 42, 60, respectively, forming a loop without the necessity of using a separate receiving formation 94 or securing mechanism 96. An equivalent alternative is two such strap segments securable to each other such as using VELCRO® hook and loop fastener material.

Figure 8:
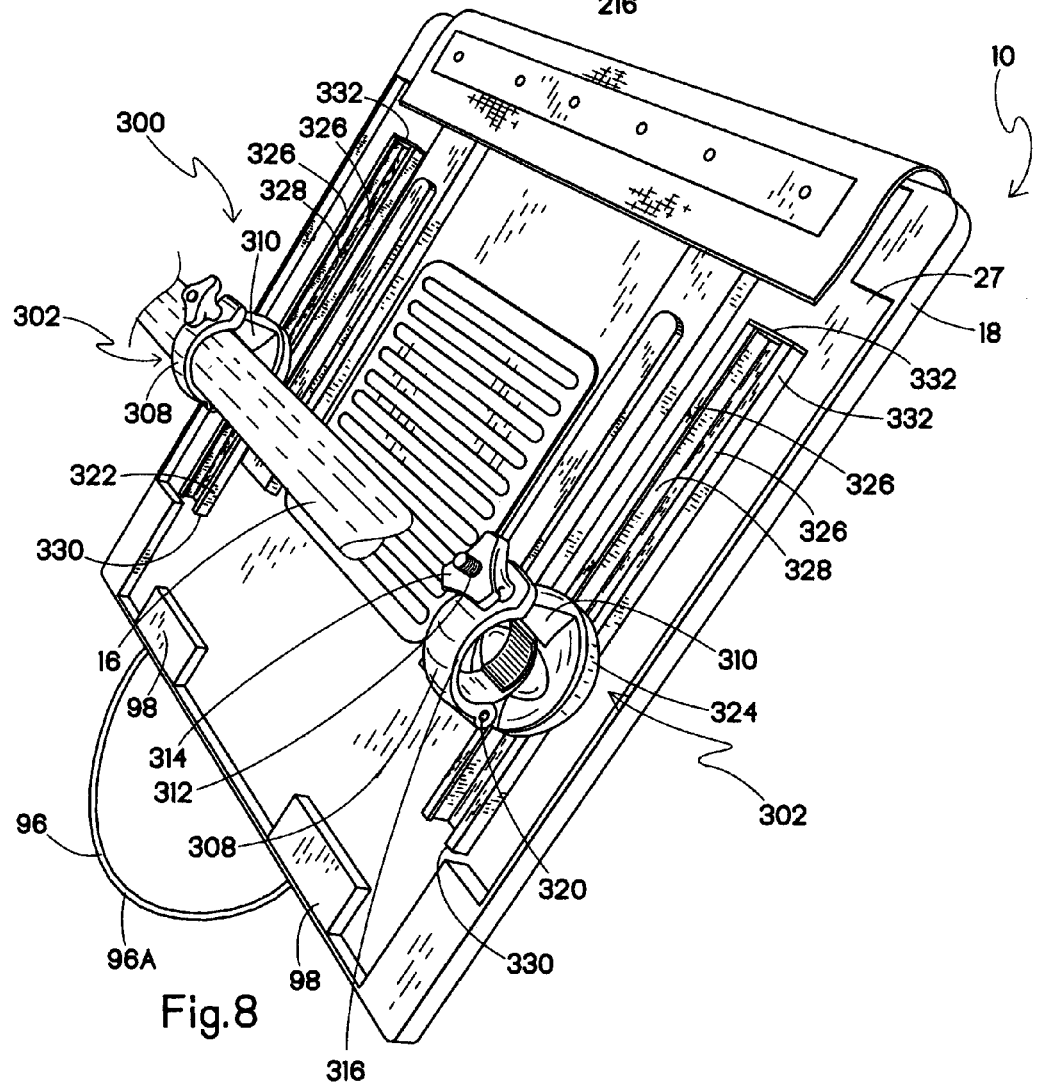
FIG. 8 is a rear perspective view of the present laptop holder employing an alternate embodiment of the clamp of FIG. 6 with the clamp closed around a cylindrical member of the exercise apparatus.

Referring now to FIG. 8, the rings 96A are secured to the base 18 at the rear surface 27, preferably in ring retainers 98. The ring retainers 98 are attached to the rear surface 27 to prevent the rings 96A from pulling out from the base 18. Further, the ring retainers 98 are preferably spaced a distance apart, and equidistant from the center of the base 18. Further, when two rings 96A are provided, (FIGS. 3 and 4), they preferably have the same length.

It is contemplated that the laptop holder 10 can be used with a variety of different sizes, shapes and types of exercise apparatus 12. In particular, when the exercise apparatus 12 does not have a generally planar surface 14, or when the generally planar surface is not suitable for use with the laptop holder 10, the laptop holder can be positioned on a generally cylindrical member 16, such as handlebars.

When the laptop holder 10 is used with at least one generally cylindrical member 16, securing structures 100 are removably and selectively attached to the rear surface 84 of the base 18. In the preferred embodiment, the securing structures 100 are clamps 102. The clamps 102 are configured to be removed when the base 18 is placed on top of the generally planar member 14, and are attachable when the base is used with the generally cylindrical member 16.

Figure 6:
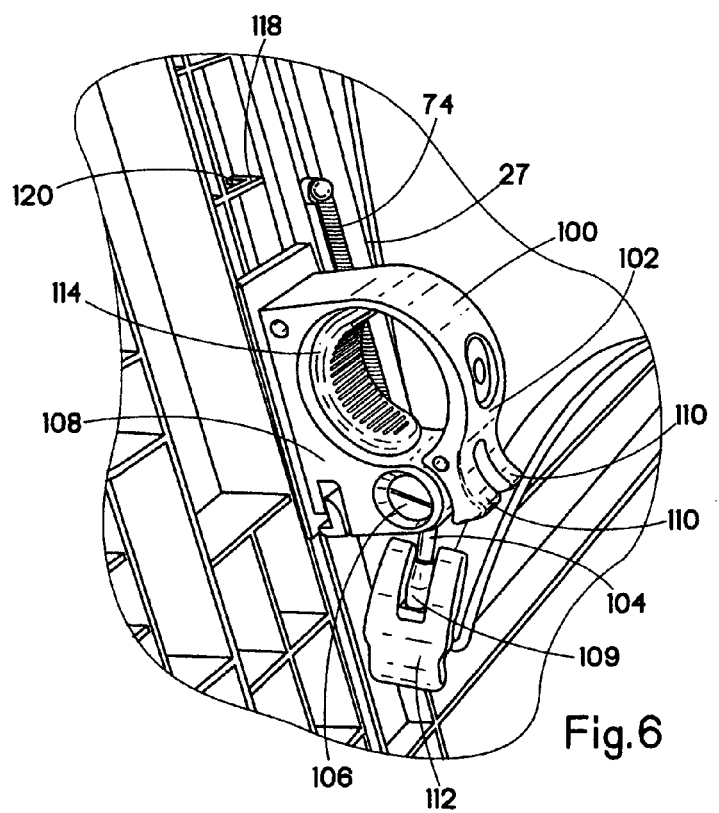
FIG. 6 is a perspective view of a clamp on the laptop holder of FIG. 1 with the clamp open.

Referring now to FIG. 6, the clamp 102 includes a lever 104 pivotable about a pin 106 located in a generally C-shaped, deformable clamping member 108. FIG. 6 shows the lever 104 in the open position, where the clamping member 108 is freely deformable for accommodating the generally cylindrical member 16. As the lever 104 is pivoted upwards from the open to the closed position, a free end 109 of the pivoting lever applies a push to the clamping member 108, and a pull to the pin 106. When the free end 109 of the lever 104 is located between prongs 110 of the clamping member 108, the lever is maintained inside the prongs by a handle 112 threadably engaged on the free end 109, and the clamping member is closed down around the generally cylindrical member 16. In this configuration, the clamp 102 is a "quick-release" clamp which enables the laptop holder 10 to be quickly inserted on and removed from the exercise apparatus 12.

A gripping member 114 is disposed inside the clamping member 108 and is configured to engage the generally cylindrical member 16. The gripping member 114 is preferably made from a rubber or other resilient material and is configured to prevent the relative movement between the generally cylindrical member 16 and the clamp 102.

Figure 7:
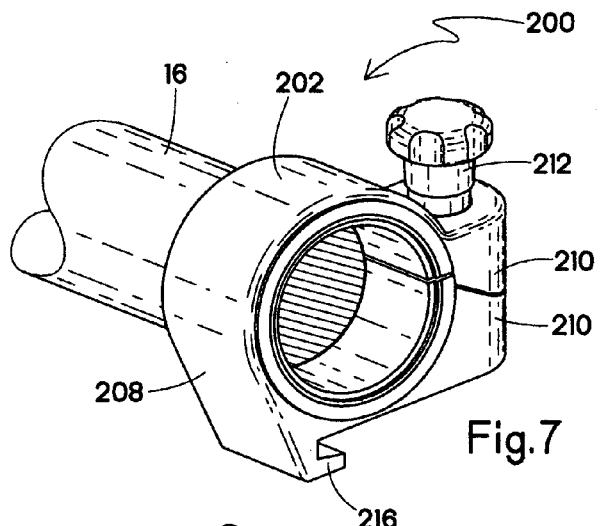
FIG. 7 is a perspective view of an alternate embodiment of the clamp of FIG. 6.

An alternate embodiment of the securing structure 100 is shown in FIG. 7 and is generally designated 200. The securing structure 200 is a clamp 202 which includes a clamping member 208 that is deformable to insert a generally cylindrical member 16 when two ends 210 of the clamp are opened. The clamps 102, 202 are preferably made from resilient plastic, or any other material that permits the repeated opening and closing of the two ends 210. Alternatively, the clamp 202 may be provided with a hinge.

The two ends 210 of the clamping member 200 are secured with a threaded fastener 212. The clamps 102, 202 are selectively positioned on the rear surface 27 of the base 18 with clips 216. The clips 216 are configured to engage ribs 118 on the rear surface 27 of the base 18. In the preferred embodiment, the clips 216 extend through apertures 120 in the ribs 118 (FIG. 6) to hook the securing structure 100 on to the base 18. The clips 216 enable the clamps 102, 202 to be removed from the rear surface 27 when the laptop holder 10 is used with a generally planar surface 14, and the clips also enable the user to place the clamps in a desired location on the rear surface of the base for selectively positioning the holder on the generally cylindrical member 16.

A further alternate embodiment of the securing structure 100 is shown in FIG. 8 and is generally designated 300. The securing structure 300 is a clamp 302 which includes a clamping member 308 that is pivotable with respect to a bottom clamp member 310. A threaded fastener 312 and a threaded knob 314 secure the clamping member 308 to the bottom clamp member 310. Preferably, the threaded member 312 extends through both the bottom clamp member 310 and the clamping member 308, and the knob 314 is rotated in the manner of a nut down onto the threaded fastener 312 to prevent the clamping member from pivoting away from the bottom clamp member.

The clamping member 308 and the bottom clamp member 310 each preferably have a semi-circular shape such that, when the clamping member 308 and the bottom clamp member 310 are clamped together, the members form a generally circular aperture 316. A generally cylindrical member 16 can be inserted into the aperture 316, and the clamping member 308 can be pivoted with respect to the bottom clamp member 310 until the cylindrical member 16 is secured in the clamp 302.

The clamp 302 is preferably provided with a hinge 320. Alternatively, the clamp 302 can be made from resilient plastic, or any other material that permits the repeated opening and closing of the clamping member 308 with the bottom clamp member 310. Further still, the clamping member 308 and the bottom clamp member 310 can be two separate members which are only operatively attached to each other through the threaded member 312. It is also contemplated that other configurations of clamps can be used.

The clamp 302 is slidingly mounted on a track 322 disposed on the rear surface 27 of the base 18. In this configuration, the clamp 302 can be selectively located along the track 322 to position the clamp in the desired location along the height of the laptop holder 10. In the preferred embodiment, the clamp 302 has a slider 324, a portion of which is disposed between each rail 326 of the track 322. Further, the portion of the slider 324 is disposed on the track 322 within a groove 328 formed by the rails 326.

Additionally, the clamp 302 can rotate with respect to the base 18 to provide 360-degrees of adjustability in the plane of the base. It is preferred that the rotation is not free, but that the clamp 302 is selectively lockable in a number of positions about the 360-degrees of adjustability. Preferably, the bottom clamp member 310 is rotatably disposed on the slider 324, however, any configuration of slider which permits the rotation of the clamp 302 with respect to the track 322 while also being configured to maintain the clamp between the rails 326 is contemplated. For example, the slider 324 and the clamp 302 may be a single structure, and the slider 324 may be cylindrical or spherical in shape to permit slider to pivot within the groove 328 of the track 322.

When the laptop holder 10 is to be used with a generally planar surface 14, the clamps 302 can be removed from the rear surface 27 of the base 18. The slider 324 can be removed from the track 322 by sliding the clamp 302 off at least one end 330 of the track. When the laptop holder 10 is to be used with the generally cylindrical member 16, the clamp 302 can be positioned onto the rear surface 27 of the base by sliding the slider 324 onto the track 322 in a reverse direction. Preferably, a cap 332 is disposed at one end of the track 322 to keep the slider 324 on the track.

While a particular embodiment of the present laptop holder for mounting on an exercise apparatus has been disclosed herein, it will be appreciated by those skilled in the art that changes and modifications may be made thereto without departing from the invention in its broader aspects and as set forth in the following claims.

The invention claimed is:

1. A laptop computer holder for mounting on a planar surface of an exercise apparatus, comprising:
   a base having a generally planar front surface for receiving a laptop computer and a rear surface configured for engaging a generally planar surface of the exercise apparatus, said base having peripheral edges that are generally coplanar with said planar front surface of said base;
   a single strap extending from an upper edge of said base and having generally the same width as the base, said strap configured to wrap around a portion of the exercise apparatus to form a loop with said base;
   at least one pocket disposed on said base defining a pocket opening configured for receiving a laptop computer; and
   an open window through said base and disposed generally centrally on said base;
   at least one ring extending from a lower edge of said base opposite said upper edge of said base;
   at least one hook disposed on said single strap, whereby said ring is hooked on the hook to form said loop; and
   at least one tab located on said front surface of said base, said tab having a leg extending generally perpendicularly from said front surface.

2. The laptop computer holder of claim 1 further comprising vents extending from said rear surface of said base to said front surface of said base.

3. The laptop computer holder of claim 1 wherein said tab is slidingly disposed in a slot for selective movement along the front surface of said base.

4. The laptop computer holder of claim 3 wherein said tab is biased in one direction in said slot.

5. The laptop computer holder of claim 1 wherein said at least one pocket comprises multiple pockets configured for accommodating different dimensions of said laptop.

6. A laptop computer holder for mounting on an exercise apparatus, comprising:
   a base having a planar front surface and peripheral edges that are generally coplanar with said planar front surface of said base, said planar front surface configured for receiving a laptop computer, said base having a rear surface configured for engaging a generally planar surface of the exercise apparatus;
   at least one removable clamp on said base configured for engaging the exercise apparatus, wherein said at least one clamp is selectively attachable to said rear surface of the base at a plurality of locations, wherein said at least one clamp is slidable on a track on said base, wherein said track is generally in the same plane as said rear surface of said base; and
   a pocket disposed on said base defining a pocket opening configured for receiving a laptop computer, wherein said pocket has a width that extends from a first edge of said base to a second edge of said base and corresponding to an entire width of said base, and a height corresponding to about a third of a height of said base; and
   at least one tab located on said front surface of said base, said tab having a leg extending generally perpendicularly from said front surface.

7. The laptop computer holder of claim 6 further comprising an open window through said base and disposed generally centrally on said base.

8. The laptop computer holder of claim 6 wherein said pocket comprises a first pocket having a first pocket height higher than a second pocket having a second pocket height for holding laptops at two different heights on said base.

9. A laptop computer holder for mounting on a planar surface of an exercise apparatus, comprising:
   a base having a generally planar front surface for receiving a laptop computer and a rear surface configured for engaging a generally planar surface of the exercise apparatus, said base having peripheral edges that are generally coplanar with said planar front surface of said base;
   at least one strap extending from an upper edge of said base and configured to wrap around a portion of the exercise apparatus to form a loop with said base;
   a pocket disposed on said base defining a pocket opening configured for receiving a laptop computer, wherein said pocket has a width that extends from a first edge of said base to a second edge of said base and corresponding to an entire width of said base, and a height corresponding to about a third of a height of said base;
   an open window through said base and disposed generally centrally on said base;
   at least one ring extending from a lower edge of said base opposite said upper edge of said base;
   at least one hook disposed on said at least one strap, whereby said ring is hooked on the hook to form said loop;
   at least one removable clamp on said base configured for engaging the exercise apparatus, wherein said at least one clamp is selectively attachable to said rear surface of the base at a plurality of locations, wherein said at least one clamp is slidable on a track on said base, wherein said track is generally in the same plane as said rear surface of said base;
   at least one vent extending from said rear surface of said base to said front surface of said base; and
   at least one tab located on said front surface of said base, said tab having a leg extending generally perpendicularly from said front surface.

* * * * *